May 2, 1939. W. G. RANSOM 2,157,015
BRAKE MECHANISM
Filed Feb. 14, 1938 4 Sheets-Sheet 1
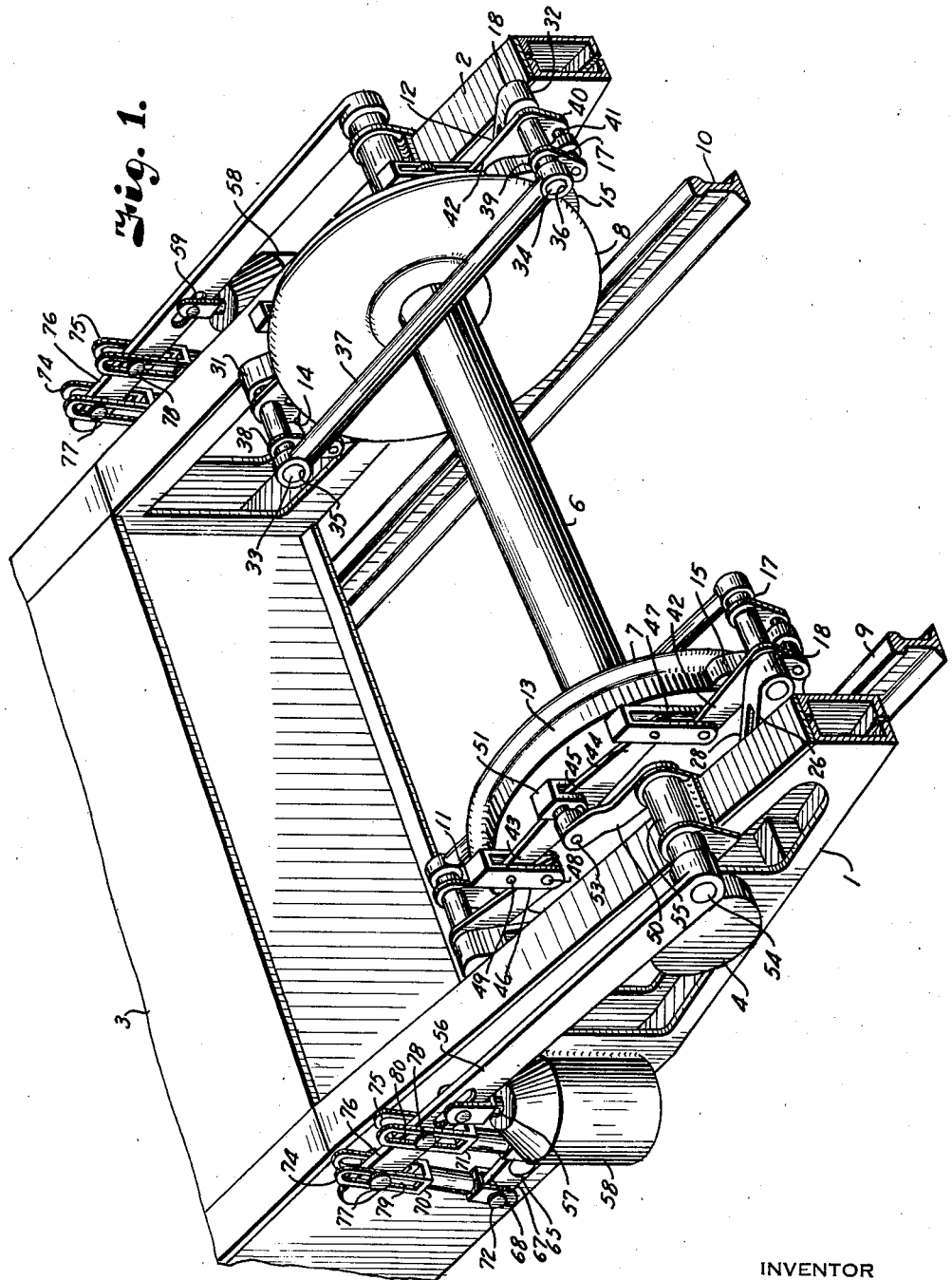
Fig. 1.
INVENTOR
Willard G. Ransom
BY
ATTORNEY

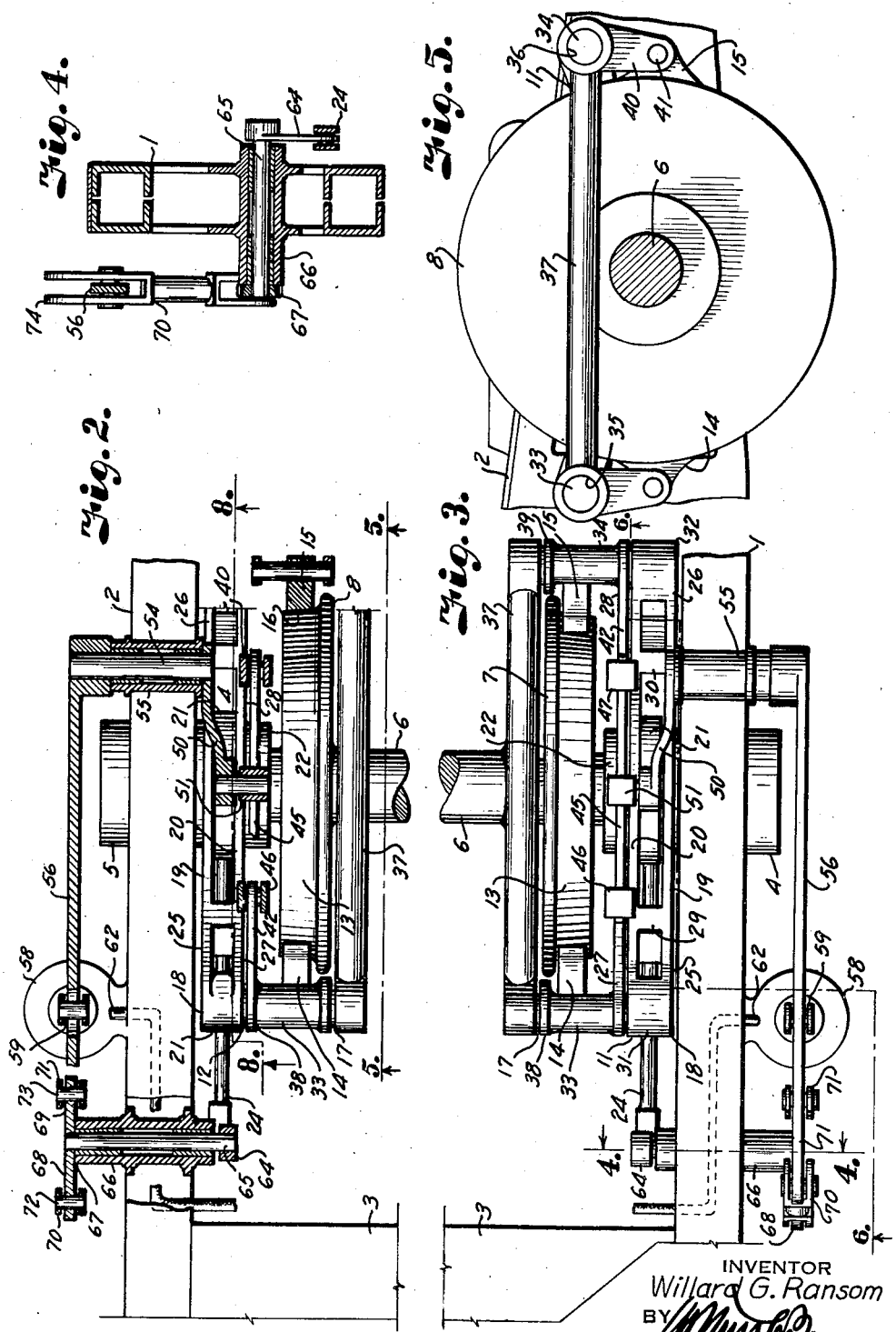

May 2, 1939.  W. G. RANSOM  2,157,015
BRAKE MECHANISM
Filed Feb. 14, 1938  4 Sheets-Sheet 3
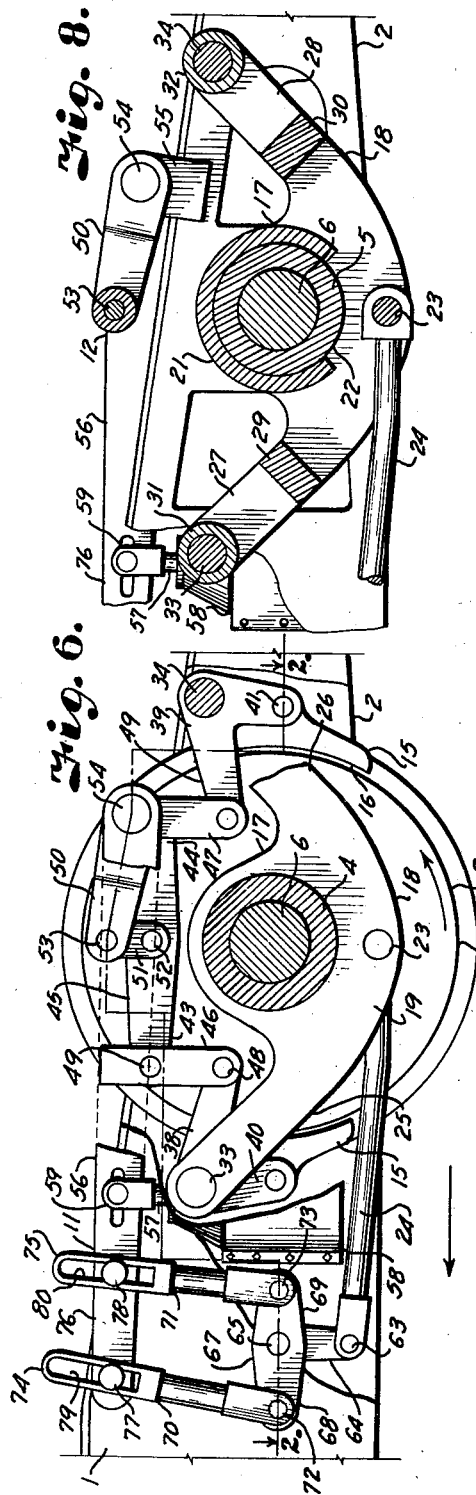
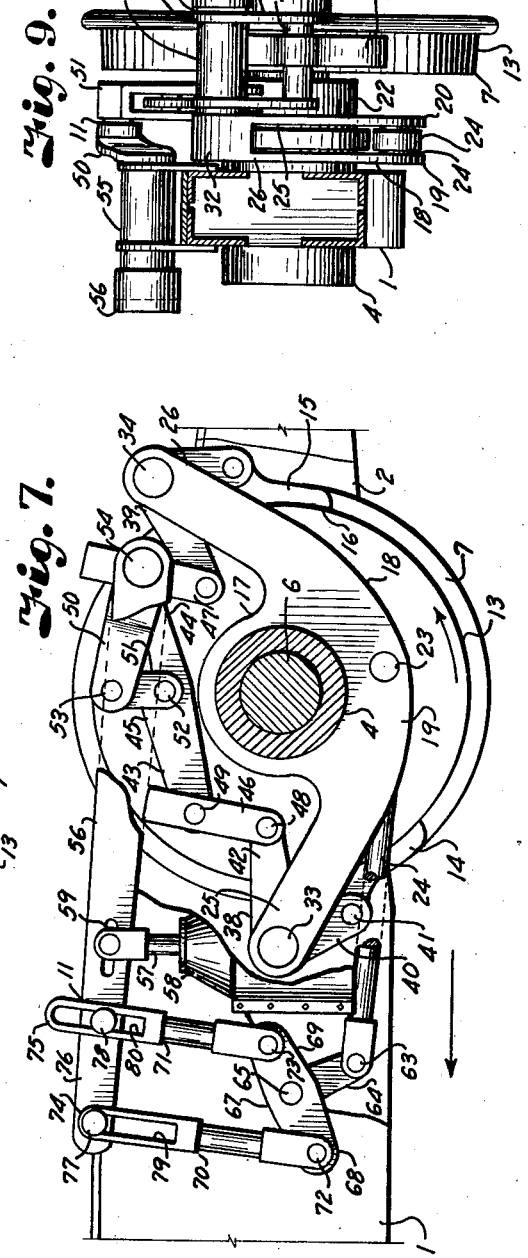
INVENTOR
Willard G. Ransom
BY
ATTORNEY May 2, 1939.    W. G. RANSOM    2,157,015
BRAKE MECHANISM
Filed Feb. 14, 1938    4 Sheets-Sheet 4
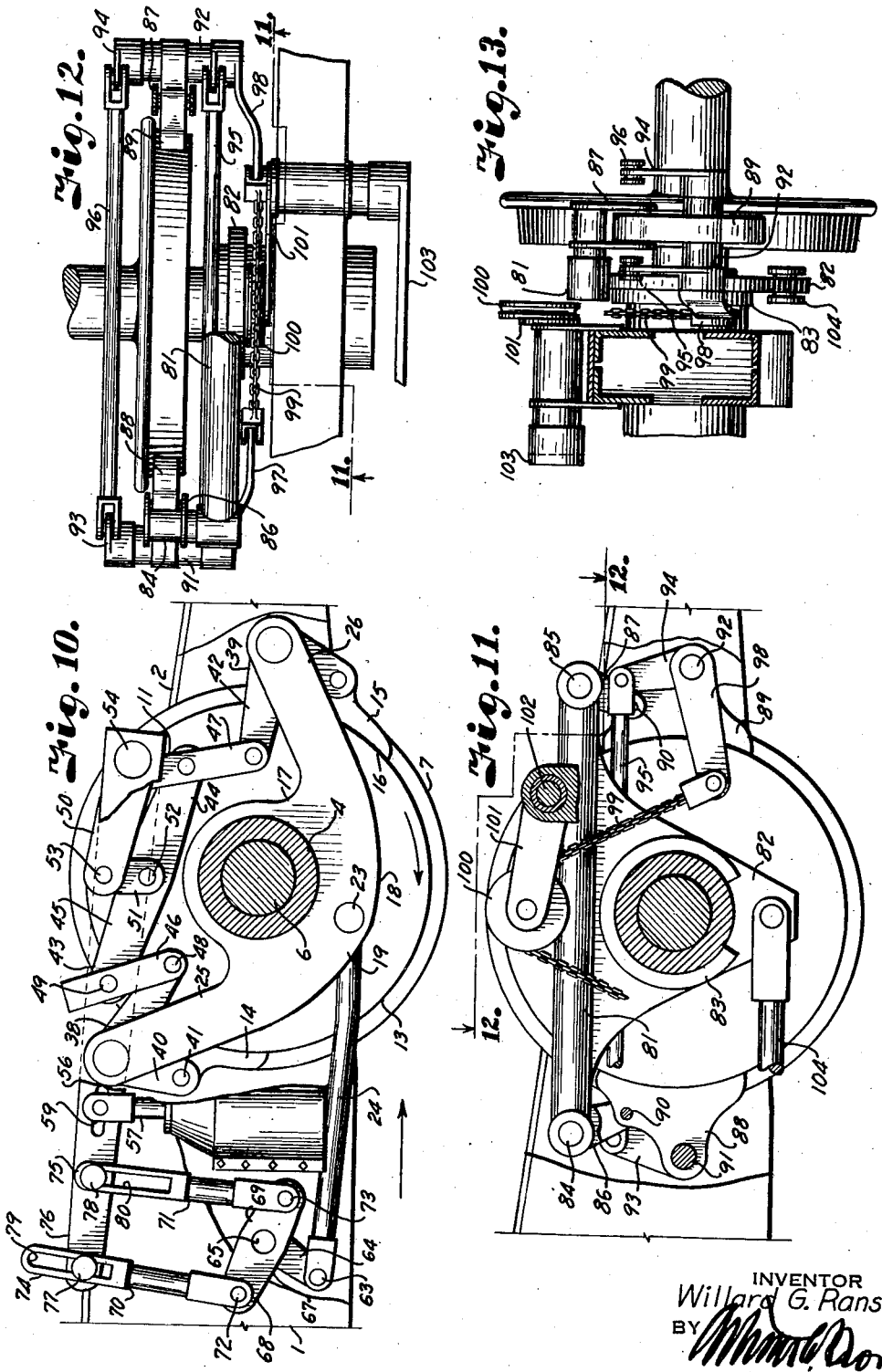
INVENTOR
Willard G. Ransom
BY
ATTORNEY Patented May 2, 1939

2,157,015

UNITED STATES PATENT OFFICE 2,157,015

BRAKE MECHANISM

Willard G. Ransom, Homewood, Kans.

Application February 14, 1938, Serial No. 190,439

15 Claims. (Cl. 188—181)

This invention relates to brake mechanisms especially designed to compensate in part for the undesirable effect which results when the coefficient of friction between the brake shoes and the wheels change.

The advent of high speed operation of railway trains made necessary the introduction of more powerful retarding forces. The actual force of retardation due to placing brake shoes in contact with the car wheels with a constant and uniform direct pressure varies considerably with time of application, speed of rotation of wheel, temperature between wheels and brake shoes, and amount of pressure per unit of area, etc.

Provision for reducing the direct pressure of the shoes against the wheels during emergency applications or excessive service applications has heretofore been made by reducing the force of the brake actuating unit (which is usually in the form of compressed air cylinders and force reduction accomplished by reducing the pressure in such cylinders) with reduction of speed and the tendency to slide wheels at low speeds.

However, heretofore no means of a practical nature has, to my knowledge, been provided for increasing the direct pressure of brake shoes against the wheels where a reducing coefficient of friction might reduce the retarding effort below that rate of retardation permissible and desirable. The maximum retardation possible without wheels sliding is proportionate to the factor of adhesion between wheel and rail, and this factor is much more constant than is the coefficient of friction between brake shoes and wheels. Therefore, it is desirable to provide means for automatically changing the direct pressure of brake shoes against the wheels when the coefficient of friction changes so as to obtain as near the maximum retardation as is possible without sliding wheels.

The principal object of this invention is to provide a brake mechanism wherein the retarding force will automatically vary with changes in coefficient of friction so as to avoid wheel sliding with a high coefficient of friction between brake shoe and wheel and at the same time cause an increase of direct pressure between the brake shoe and the wheel as the coefficient of friction decreases.

A further object is to provide a brake mechanism wherein a plurality of brake shoes are arranged so that the combined rotary efforts thereof in conjunction with changes in coefficient of friction act to regulate the ultimate retarding effort of a wheel.

Other important objects of the invention are to equip each wheel of a truck with an individual braking mechanism; to provide a braking mechanism of this character which is equally effective in either direction of wheel rotation; and to obtain an improved and more effective retarding effort with the applied braking force.

In accomplishing these and other objects of the invention, as hereinafter pointed out, I have provided improved details of structure, the preferred form of which is illustrated in the accompanying drawings, wherein:

Fig. 1 is a fragmentary perspective view of one end of a railway truck adapted for supporting one end of a car body.

Fig. 2 is a plan view of a portion of one side of the truck with parts of the brake lever control mechanism shown in horizontal section taken on the line 2—2 of Fig. 6.

Fig. 3 is a similar plan view of the opposite side.

Fig. 4 is a vertical section through one side of the frame on the line 4—4 of Fig. 3.

Fig. 5 is a section through a portion of the truck on the line 5—5 of Fig. 2, particularly illustrating the tension bar of the brake supporting frame.

Fig. 6 is a longitudinal section taken substantially on the line 6—6 of Fig. 3 and showing the brakes in running position and prior to setting thereof.

Fig. 7 is a similar view showing the brakes in set condition for reducing the speed of the train.

Fig. 8 is a longitudinal section on the line 8—8 of Fig. 2.

Fig. 9 is a cross-section through one side of the truck frame showing the brake mechanism for the adjacent wheel in end elevation.

Fig. 10 is a view substantially similar to that illustrated in Fig. 7 and showing application of the brakes when the train is moving in the opposite direction.

Fig. 11 is a vertical longitudinal section through a portion of a truck equipped with a brake mechanism of slightly modified construction and taken on the line 11—11 of Fig. 12.

Fig. 12 is a plan view of the form of the invention illustrated in Fig. 11, a part of which is shown in section as taken on the line 12—12 of Fig. 11.

Fig. 13 is an end elevation view of the portion of the truck illustrated in Fig. 11.

Referring more in detail to the drawings:

1 and 2 designate the side frames of a railroad truck such as may be used in supporting the end of a railway vehicle capable of operating at high speeds. The side frames 1 and 2 are connected intermediate their ends by the usual cross members 3 to form a rigid structure. Carried by the ends of the frame members are aligning bearings 4 and 5 for rotatably journaling the ends of an axle 6 carrying flanged wheels 7 and 8 operable upon the rails 9 and 10. While the drawings illustrate only one end of a truck, the opposite end is of identically the same construction and is carried on the rails by a similar axle having wheels operable on the rails 9 and 10.

Mounted on the truck, in association with each of the wheels, is a brake mechanism 11 and 12 which is constructed according to the present invention and wherewith a braking force is applied to the tread faces 13 of each of the wheels through pairs of brake shoes 14 and 15 that engage the treads at substantially opposite diametrical points on each wheel. The pairs of brake shoes have arcuate faces 16, corresponding to the curvature of the treads and of sufficient size to adequately distribute the braking pressure over the face of the treads. As above pointed out, the coefficient of friction between the faces 16 of the brake shoes and the tread faces 13 of the wheels varies with changes of speed, time of application, amount of pressure per unit of area, etc.

In carrying out the automatic feature of the invention, I have discovered that there is an effort on the part of the brake shoes to grip the rotating wheels with the result that the brake shoes when applied tend to move with the wheels in the direction of rotation thereof, and that this tendency is directly proportional to change in the coefficient of friction. I, therefore, utilize the combined rotating effort of the brake shoes to effect automatic control of the applied pressure, thereby allowing for application of power in amounts sufficient to obtain maximum braking action throughout the entire range of speed change, time of application, amount of pressure, and other causes of friction change, without sliding of the wheels at the lower speeds and yet obtain a high retarding effect at high speeds.

In carrying out the invention I provide for support of the brake shoes of each wheel on an individual carrying frame 17 that is adapted to cradle about the axis of the wheels so that the brake shoes are allowed to move with the rotation of the wheels, which movement is resisted by the braking force used in setting of the shoes. The frame 17 includes a rocker member 18 located between the outer sides of the respective wheels and the adjacent inner sides of the truck frame and consists of spaced plates 19 and 20 connected by a hub 21 that is oscillatably journaled upon a lateral extension 22 of the adjacent axle supporting bearing. The plates extend arcuately below the axis of the hubs and are interconnected by pins 23 to which connecting links 24 are attached, as later described. The plates 19 and 20 have outwardly and upwardly extending arms 25—26 and 27—28 that are connected by webs 29 and 30 and bearing bosses 31 and 32, the bosses having their axes extending beyond the periphery of the wheels to carry the outer ends of brake shoe supporting shafts 33 and 34. The shafts 33 and 34 extend across the faces of the respective wheels and have their inner ends mounted in openings 35 and 36 that are formed in the ends of a connecting bar 37 constituting the opposite side of the shoe carrying frame.

Journaled on the shafts 35 and 36 in line with the tread faces of the wheels are bell cranks 38 and 39 having depending yoke-shaped arms 40 carrying cross pins 41 on which the respective shoes 14 and 15 are pivotally mounted. The other arms 42 of the bell cranks extend inwardly toward the axle and connect with the ends 43 and 44 of an equalizer bar 45 by means of yoke-shaped links 46 and 47. The links 46 and 47 are pivotally connected with the respective arms and with the equalizer bar by pivot pins 48 and 49 extending therethrough as best shown in Fig. 6. The equalizer bar is suspended from an arm 50 by a link 51 having its ends respectively connected with the equalizer bar and the rocker arm by pivot pins 52 and 53. The rocker arm 50 is fixed on a rock shaft 54 that is journaled in a bearing 55 carried on the side frame members, as best shown in Fig. 2. The rock shaft extends beyond the outer sides of the frame member and carries an actuating lever 56 which connects with the actuating rod 57 of an air cylinder 58 through a pin and slot connection 59. The air cylinder 58 is secured to the outer side of the side frame of the truck and is mounted in vertical position to exert substantially direct action upon the actuating lever responsive to air pressure from cylinder 58 through a piston fixed to rod 57.

When the brakes are to be set, air is applied to the cylinders so that the pistons move upwardly, to rock the actuating levers in a clockwise direction, Fig. 6, to move the rock shafts which lift the arms 50 and the equalizing levers through the link connections therewith. Since a lifting force is applied to the equalizing levers, the bell cranks are rocked on the shafts 33 and 34 so as to bring the shoes into braking relation with the tread face of the respective wheels. As soon as the brake shoes engage the wheels there is a tendency for the shoes to be rotatingly carried therewith, and since the shoe carrying frames are adapted to cradle about the axis of the wheels the frames are rocked to carry the brake shoes into position shown in Fig. 7, when the wheels are rotating in the direction indicated by the arrow. This movement, however, is restricted by the connecting link 24 which is arranged to exert a counteracting force on the brake actuating lever 56 in direct proportion to the rotational force applied to the brake shoes and tending to rotate their supporting frames, as now to be described.

The links 24 extend toward the center of the truck and are connected by pins 63 with depending arms 64 on rock shafts 65. The rock shafts 65 are journaled in bearings 66 carried by the side frames, as illustrated in Fig. 2. The shafts project through the bearings and carry levers 67 having oppositely directed arms 68 and 69 respectively connected with links 70 and 71 by pins 72 and 73. The links 70 and 71 extend upwardly and have slotted heads 74 and 75 connected with projecting ends 76 of the brake actuating levers, the connections being effected by headed pins 77 and 78 projecting laterally from the sides of the arms and extending through the slots 79 and 80 of the slotted heads, as shown in Fig. 6. The slots thus provide a lost motion connection between the brake carrying frames and the actuating levers to permit relative movement thereof and to allow for change of position of the brake shoes whereby the forces tending to carry the shoes with the wheels become effective in resisting the power applied to the actuating levers proportionately to the change in coefficient of friction, the slots 79 and 80 being of sufficient length to allow rocking movement of the brake carrying frames through the range, as illustrated in Figs. 7 and 10.

The normal operating position of the brake mechanism constructed and assembled as described is illustrated in Fig. 6. In this, or released, position the actuating levers 56 are supported substantially in a horizontal position. In this position the equalizing levers 45 are in their lowermost position so that the shoes 14 and 15 are carried away from braking contact with the treads of the wheels. Assuming that the truck is moving in the direction of the arrow in Fig. 6 and that the brakes are to be applied, compressed air is admitted to the cylinders as in conventional practice to move the actuating levers in a clockwise direction, Fig. 6, thereby rocking the shafts 54, raising the arms 50 and lifting the equalizing levers. Since the levers are pivotally suspended at the centers thereof, equal pull is effected on the bell crank levers to cause swinging movement of the arms 40 thereof in the direction of the wheels, thereby carrying the brake shoes into engagement with the treads thereof. As soon as the brake shoes engage the wheels, there is a tendency for the shoes to rotate with the wheels so that the carrying frames are oscillated in the same direction as the wheel rotation, Fig. 7. Rocking of the carrying frames causes the links 24 to rock the shafts 65 in a counter-clockwise direction, thereby drawing the connecting links 70 downwardly and lifting the connecting links 71. As soon as the upper ends of the slots 79 engage the pins 77, pressure is applied to draw the actuating levers 56 downwardly in opposition to the force tending to lift them, and this counteracting force is directly proportional to tendency of the shoes to rotate with the wheels, which tendency varies in proportion to change of coefficient of friction. For example, under certain conditions the coefficient of friction between the shoes and the treads of the wheels is at the lowest point and the counteracting force applied through the brake carrying frames is small in proportion to the force tending to apply the brakes so that the brakes are applied with full effect. When the coefficient of friction increases so that there is better gripping engagement between the faces of the shoes and the treads of the wheels, the force tending to rock the shoe carrying frames becomes greater and the pull on the actuating arms by means of the links 70 is correspondingly increased to counteract the action of air cylinder 58 tending to set the brakes, thereby relieving the direct pressure on the shoes and keeping the resultant braking effect proportionately more uniform. Assuming that the train is moving in the opposite direction, the operation of the lever mechanisms is reversed and the counteracting pressure is applied through the connecting links 71 to exert a downward counteracting pull on the actuating levers, as shown in Fig. 10, attention being directed to the fact that the lever arm 69 is shorter than the arm 68 to compensate for the differences in the leverages effected through the respective links 70 and 71.

In Figs. 11 to 13 inclusive is illustrated a modified form of the invention wherein the brake carrying frame includes a bar 81 having a depending plate 82 provided with a hub 83 that is journaled upon the axle bearing. Carried by the ends of the bar 81 are rock shafts 84 and 85 having depending arms 86 and 87 connected with the upper portions of the brake shoes 88 and 89 by pins 90. Rotatably mounted in the brake shoes are shafts 91 and 92 carrying pairs of upwardly extending arms 93 and 94 that are interconnected by rods 95 and 96. Also fixed on the rock shafts 91 and 92 are inwardly extending levers 97 and 98 having their ends interconnected by a chain 99. The chain 99 operates over a flanged pulley 100 that is rotatably carried on a rocker arm 101 which is fixed to a brake actuating shaft 102 similar to the brake operating shaft 54 illustrated in connection with the preferred form of the invention. The shaft 102 carries a brake actuating arm 103 that is connected with a brake cylinder (not shown) but which is identical to those illustrated in the preferred form of the invention. The plate 82 is connected by a link 104 with a control mechanism (not shown) similar to the control mechanisms in the first form of the invention.

With the construction illustrated in Figs. 11 to 13, it is obvious that clockwise movement of the lever arms 101 will exert lifting pressure on the arms 97 and 98, and since the arms 93 and 94 are connected by links 95 and 96, the shafts 91 and 92 are drawn toward the wheels to bring the brake shoes into braking relation therewith. Rotation of the wheels then tends to rotate the shoes therewith to cause corresponding rocking movement of the plates 82 wherethrough a counteracting force is applied to the actuating levers in the same manner as described in the first form of the invention. In both forms of the invention it will be seen that there is provided means constantly reacting on the brake applying or actuating means and dependent upon the coefficient of friction for causing an increase of the direct pressure of the brake member or brake shoe against the wheel as the coefficient of friction decreases and for causing a decrease in the direct pressure of the brake member or brake shoe against the wheel as the coefficient of friction increases.

From the foregoing it is obvious that I have provided a brake mechanism which is automatically controlled proportional to changes in the coefficient of friction so that maximum braking pressures are applied without locking the wheels with a high coefficient of friction but at the same time automatically increasing the direct pressure of the shoes against the wheels whenever the coefficient of friction decreases.

In carrying out the present invention the mechanism is so designed that the retarding effort changes whenever the coefficient of friction changes in a ratio less than the ratio of change in coefficient of friction. To accomplish this the brake shoes are so mounted that the brake shoes and brake shoe supports can rotate a certain amount about the wheel center. That is, as the brake actuating mechanism forces the brake shoes against the face of the wheel, the friction of this contact sets up a rotating force of shoes 14 and 15, Fig. 10, clockwise with the wheel, which rotation, together with the brake shoe carrying frame 17, is resisted by rod 24 connected by pin 63 to lever 64. Lever 64 rotates about shaft 65, whereas lever arm 69 through pin 73 and rod 71 prevents a movement beyond the limit of slot 80 and pin 75 on the cylinder lever 76. No further movement of rotation of shoes 14—15 is possible after the limit of slot 80 is reached and the force at pin 75 reacts against the force of air cylinder 58.

The amount of such reaction depends upon the total amount of direct pressure on shoes 14 and 15 times the coefficient of friction, times the lever factor represented by the various levers and connections in the chain of mechanism leading from shoes 14 and 15 to the point of effective reaction against the actuating force or air cylinder 58.

An analysis of this mechanism will clearly show that the reaction against the air cylinder as shown will be less with a low coefficient of friction than when the coefficient of friction is high and vice versa.

What I claim and desire to secure by Letters Patent is:

1. In combination with a wheel, a brake member frictionally engaging the wheel, means for applying a braking force to the brake member, and means constantly reacting on the brake applying means and dependent upon the coefficient of friction for causing an increase of the direct pressure of the brake member against the wheel as the coefficient of friction decreases and for causing a decrease of the direct pressure of the brake member against the wheel as the coefficient of friction increases.

2. A brake mechanism for controlling rotational speed of a wheel including a brake shoe, means supporting the shoe for movement in the direction of wheel rotation, an actuator for moving the brake shoe into brake contact with the wheel, and means connected with the actuator and movable with said supporting means constantly reacting on the actuator for counteracting the force applied to the shoe in proportion to the tendency of said shoe to rotate with the wheel.

3. A brake mechanism for controlling rotation of a wheel including a pair of brake shoes arranged to engage the wheel at opposite diametrical sides of the wheel, means supporting the shoes for movement in the direction of rotation of the wheel, an actuator for moving the shoes into braking contact with the wheel, means connecting the actuator with the shoes, and means connected with the actuator and movable with said supporting means for constantly reacting on the actuator for counteracting the force applied to the shoes in proportion to the tendency of said shoes to rotate with the wheel.

4. A brake mechanism for controlling rotation of a wheel including a brake shoe engaging the wheel, a brake shoe support for said shoe, means mounting the brake shoe support for rocking movement of the support and the brake shoe about the axis of the wheel, means for moving the brake shoe to and from the wheel, and control means responsive to rocking of the brake shoe support and acting in opposition to said brake shoe moving means for controlling the ultimate pressure effected against the wheel by said brake shoe moving means.

5. A brake mechanism for controlling rotation of a wheel including a brake shoe engaging the wheel, a brake shoe support for said shoe, means mounting the brake shoe support for rocking movement of the support and the brake shoe about the axis of the wheel, means for moving the brake shoe to and from the wheel, and control means responsive to rocking movement of the brake shoe support for constantly reacting against the brake shoe moving means to control the ultimate brake shoe pressure against the wheel.

6. A brake mechanism for controlling rotation of a wheel including a brake shoe supporting frame arranged to rock about the axis of said wheel, bell crank levers carried by said frame, brake shoes suspended from the bell crank levers, an equalizing bar connecting the bell crank levers, a rock shaft, an arm on the rock shaft connected with the equalizing bar, an actuating lever on the rock shaft, and pressure fluid means connected with the actuating lever for effecting engagement of the shoes against the wheel.

7. A brake mechanism for controlling rotation of a wheel including a brake shoe supporting frame arranged to rock about the axis of said wheel, bell crank levers carried by said frame, brake shoes suspended from the bell crank levers, an equalizing bar connecting the bell crank levers, a rock shaft, an arm on the rock shaft connected with the equalizing bar, an actuating lever on the rock shaft, pressure fluid means connected with the actuating lever for effecting engagement of the shoes with the wheel, and means connecting with the supporting frame and engaging the actuating lever for controlling the effective force applied through said actuating lever.

8. A brake mechanism for controlling rotation of a wheel including a brake shoe supporting frame arranged to rock about the axis of said wheel, bell crank levers carried by said frame, brake shoes suspended from the bell crank levers, an equalizing bar connecting the bell crank levers, a rock shaft, an arm on the rock shaft connected with the equalizing bar, an actuating lever on the rock shaft, a link having lost motion connection with the actuating lever, a rock lever connected with said link, and means connecting the rock lever with the shoe carrying frame.

9. A brake mechanism for controlling rotation of a wheel including a brake shoe supporting frame arranged to rock about the axis of said wheel, bell crank levers carried by said frame, brake shoes suspended from the bell crank levers, an equalizing bar connecting the bell crank levers, a rock shaft, an arm on the rock shaft connected with the equalizing bar, an actuating lever on the rock shaft, a pair of links having lost motion connection with the actuating lever, a rock lever connected with said links, and means connecting the rock lever with the shoe supporting frame.

10. A brake mechanism for railroad trucks having pairs of wheels, individual brake mechanisms for the respective wheels, individual means for applying actuating forces to the respective brake mechanisms, and means constantly reacting against the brake actuating means and responsive to variation in coefficient of friction for causing an increase in the direct pressure of the brake mechanism against the wheel as the coefficient of friction decreases and for causing a decrease of the direct pressure of the brake mechanism against the wheel as the coefficient of friction increases.

11. In a truck of the character described, a frame, an axle carried by the frame, wheels on the axle, brake shoes for the wheels, means supporting the shoes for rotational movement with respect to the axle, actuators for moving the shoes into braking contact with the wheels, and means connected with the actuators and movable with said supporting means constantly reacting against the actuator for counteracting the forces applied to the shoes in proportion to the tendency of said shoes to rotate with the wheels for causing an increase of the direct pressure of the brake shoes against the wheels as the coefficient of friction decreases and for causing a decrease of the direct pressure of the brake shoes against the wheels as the coefficient of friction increases.

12. A brake mechanism for controlling rotation of a wheel including a plurality of brake shoes each having a tendency to rotate with the wheel when a braking force is applied to said shoes, actuating means for applying said braking force to all of the shoes, and means connecting the shoes with said actuating means responsive to the combined rotative tendency of all of the brake shoes for causing an increase of the direct pressure of the brake shoes against the wheel as the coefficient of friction decreases and for causing a decrease of the direct pressure of the brake shoes against the wheel as the coefficient of friction increases.

13. A brake mechanism for controlling rotation of a wheel including a plurality of brake shoes for engaging the wheel, common means for mounting the brake shoes for movement of the mounting means and the brake shoes about the axis of the wheel, actuating means for moving the brake shoes into frictional contact with the wheel whereby all of the brake shoes are effective in movement of said mounting means, and means responsive to the movement of the brake shoe mounting means and constantly reacting against the actuating means for controlling the retarding force of said brake shoes.

14. A brake mechanism for controlling rotation of a wheel including a plurality of brake shoes arranged to engage the wheel at spaced points about the tread of the wheel, common means for supporting the shoes for arcuate movement of the brake shoes and the supporting means in either direction about the axis of the wheel depending upon the direction of wheel rotation, an actuator for moving the shoes into frictional contact with the wheel, and means connected with the actuator and movable by said brake shoe supporting means and constantly reacting against the actuator for causing an increase of the direct pressure of the brake shoes against the wheel as the coefficient of friction decreases and for causing a decrease of the direct pressure of the brake shoes against the wheel as the coefficient of friction increases.

15. In combination with a wheel, a brake member frictionally engaging the wheel, means for applying a braking force to the brake member, and means constantly reacting on the brake applying means and dependent upon the coefficient of friction for causing an increase of the direct pressure of the brake member against the wheel as the coefficient of friction decreases.

WILLARD G. RANSOM.